(12) United States Patent
Dehnert et al.

(10) Patent No.: US 10,394,792 B1
(45) Date of Patent: *Aug. 27, 2019

(54) DATA STORAGE IN A GRAPH PROCESSING SYSTEM

(71) Applicant: Google LLC, Mountain View, CA (US)

(72) Inventors: James C. Dehnert, Palo Alto, CA (US); Matthew Harold Austern, Palo Alto, CA (US); Aart J. C. Bik, Union City, CA (US); Grzegorz J. Czajkowski, Redwood City, CA (US); Grzegorz Malewicz, Menlo Park, CA (US); Ilan Horn, Givat-Ada (IL); Naty Leiser, Haifa (IL)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/285,840

(22) Filed: Oct. 5, 2016

Related U.S. Application Data

(63) Continuation of application No. 13/353,556, filed on Jan. 19, 2012, now Pat. No. 9,495,477.
(Continued)

(51) Int. Cl.
  *G06F 7/00* (2006.01)
  *G06F 17/30* (2006.01)
  (Continued)

(52) U.S. Cl.
  CPC .......... *G06F 16/23* (2019.01); *G06F 16/2365* (2019.01); *G06F 16/9024* (2019.01)

(58) Field of Classification Search
  CPC ............... G06F 17/30958; G06F 8/457; G06F 16/2365; G06F 16/23; G06F 16/9024; H04L 29/08135
  (Continued)

(56) References Cited

U.S. PATENT DOCUMENTS

| 4,665,520 A | 5/1987 | Strom et al. |
| 5,440,726 A | 8/1995 | Fuchs et al. |

(Continued)

OTHER PUBLICATIONS

Anderson, T., et al., "High-Speed Switch Scheduling for Local-Area Networks," ACM Trans. Comp. Syst. 11(4): 319-352, 1993.
(Continued)

*Primary Examiner* — Md I Uddin
(74) *Attorney, Agent, or Firm* — Fish & Richardson P.C.

(57) ABSTRACT

Data are maintained in a distributed computing system that describe a directed graph representing relationships among a set of items. The directed graph models a condition having an associated problem. The directed graph has graph components having associated data fields. The relationships are analyzed to identify a solution to the problem. As part of the analysis, a new value for the data field associated with a graph component is identified responsive to an operation performed during the analysis. The new value is compared with an existing value of the data field, and the data field is modified. The modification may include inserting the new value into an overflow vector of data, and replacing the existing value in the data field with exception information identifying the location of the new value. An exception flag associated with the data field is set to indicate that the exception information is being used.

17 Claims, 8 Drawing Sheets

Related U.S. Application Data

(60) Provisional application No. 61/483,183, filed on May 6, 2011, provisional application No. 61/477,559, filed on Apr. 20, 2011.

(51) Int. Cl.
*G06F 16/23* (2019.01)
*G06F 16/901* (2019.01)

(58) Field of Classification Search
USPC .......................... 707/758, 769, 802, 999.01
See application file for complete search history.

(56) References Cited

U.S. PATENT DOCUMENTS

| | | | |
|---|---|---|---|
| 5,734,833 A | 3/1998 | Chin et al. | |
| 6,393,583 B1 | 5/2002 | Meth et al. | |
| 6,823,474 B2 | 11/2004 | Kampe et al. | |
| 7,392,258 B2 | 6/2008 | Bogner et al. | |
| 7,539,697 B1 | 5/2009 | Akella et al. | |
| 8,250,405 B2 | 8/2012 | Elnozahy | |
| 8,429,110 B2 | 4/2013 | Cai et al. | |
| 8,433,951 B1 | 4/2013 | Havemose et al. | |
| 8,458,229 B2 | 6/2013 | Oliver et al. | |
| 8,566,326 B2 | 10/2013 | Hu et al. | |
| 8,880,931 B2 | 11/2014 | Sun | |
| 2002/0067720 A1 | 6/2002 | Garcia-Luna-Aceves et al. | |
| 2003/0194007 A1 | 10/2003 | Chen et al. | |
| 2004/0139167 A1* | 7/2004 | Edsall ............... | G06F 17/30197 709/212 |
| 2006/0031509 A1 | 2/2006 | Ballette et al. | |
| 2006/0098960 A1 | 5/2006 | Okayama et al. | |
| 2006/0212860 A1 | 9/2006 | Benedikt et al. | |
| 2006/0268879 A1 | 11/2006 | Xhafa et al. | |
| 2007/0277056 A1 | 11/2007 | Varadarajan et al. | |
| 2008/0195577 A1 | 8/2008 | Fan et al. | |
| 2008/0216077 A1 | 9/2008 | Emani et al. | |
| 2008/0271022 A1 | 10/2008 | Strassner et al. | |
| 2009/0027392 A1 | 1/2009 | Jadhav et al. | |
| 2009/0044180 A1 | 2/2009 | Luszczek et al. | |
| 2009/0055343 A1 | 2/2009 | Van Lunteren | |
| 2010/0017537 A1 | 1/2010 | Linnartz et al. | |
| 2010/0042676 A1 | 2/2010 | Seroussi et al. | |
| 2010/0241827 A1 | 9/2010 | Yu et al. | |
| 2010/0250517 A1 | 9/2010 | Bendel et al. | |
| 2011/0035359 A1 | 2/2011 | Bendakovsky et al. | |
| 2011/0167425 A1 | 7/2011 | Lurie et al. | |
| 2011/0231621 A1* | 9/2011 | Liang .................. | G06F 11/1435 711/155 |
| 2011/0307436 A1 | 12/2011 | Cai et al. | |
| 2011/0314075 A1 | 12/2011 | Boldyrev et al. | |
| 2012/0173541 A1* | 7/2012 | Venkataramani ... | G06F 17/3048 707/747 |
| 2012/0233172 A1 | 9/2012 | Skillcorn et al. | |
| 2012/0254254 A1 | 10/2012 | Milousheff | |
| 2014/0129320 A1* | 5/2014 | Jebara .................... | G06Q 10/00 705/14.42 |

OTHER PUBLICATIONS

Bader, D., et al., "Designing Multithreaded Algorithms for Breadth-First Search and st-connectivity on the Cray MTA-2," in Proc. 35th Intl. Conf. on Parallel Processing (ICPP'06), Columbus, Ohio, Aug. 2006, pp. 523-530.

Barroso, L., et al., "Web search for a planet: The Google Cluster Architecture," IEEE Micro 23(2):22-28, 2003.

Bayati, M., et al., "Maximum Weight Matching via Max-Product Belief Propagation," in Proc. IEEE Intl. Symp. on Information Theory, pp. 1763-1767, 2005.

Bellman, R., "On a routing problem," Quarterly of Applied Mathematics 16(1):87-90, 1958.

Bonorden, O., et al., "The Paderborn University BSP (PUB) library," Parallel Computing 29:187-207, 2003.

Brin, S., et al., "The Anatomy of a Large-Scale Hypertextual Web Search Engine," in Proc. 7th Intl. Conf. on the World Wide Web, pp. 107-117, 1998.

Chan, A., et al., "CGMGRAPH/CGMLIB: Implementing and Testing CGM Graph Algorithms on PC Clusters and Shared Memory Machines," Intl. J. of High Performance Computing Applications 19(1):81-97, 2005.

Chang, F., et al., "Bigtable: A Distributed Storage System for Structured Data," ACM Trans. Comp. Syst. 26(2) Article 4, 26 pages, 2008.

Cherkassky, B., et al., "Shortest paths algorithms: Theory and experimental evaluation," Mathematical Programming 73:129-174, 1996.

Cohen, J., "Graph Twiddling in a MapReduce World," Comp. in Science & Engineering, pp. 29-41, Jul./Aug. 2009.

Crobak, J., et al., "Advanced Shortest Paths Algorithms on a Massively-Multithreaded Architecture," in Proc. First Workshop on Multithreaded Architectures and Applications, pp. 1-8, 2007.

Czajkowski, G., "Large-scale graph computing at Google," Google Research Admin., Jun. 2009, 1 page, [online] [retrieved Jul. 20, 2012] retrieved from the internet <http://googleresearch.blogspot.com/2009/06/large-scale-graph-computing-at-google.html>.

Daly, J., "A higher order estimate of the optimum checkpoint interval for restart dumps," Future Generation Computer Systems 22:303-312, 2006.

Dean, J., et al., "MapReduce: Simplified Data Processing on Large Clusters," in Proc. 6th USENIX Symp. On Operating Syst. Design and Impl., pp. 137-150, 2004.

Dijkstra, E., et al., "A Note on Two Problems in Connexion with Graphs," Numerische Mathematik 1269-271, 1959.

Erwig, M., "Inductive graphs and functional graph algorithms," J. Functional Programming 11(5):467-492, Sep. 2001.

Ghemawat, S., et al., "The Google File System," in Proc. 19lh ACM Symp. On Operating Syst. Principles, pp. 29-43, 2003.

Google Project Hosting, "Protobuf: Protocol Buffers—Google's data interchange format," 2 pages, [online] [retrieved Jul. 20, 2012] retrieved from the internet <http://code.google.com/p/protobuf/2009>.

Goudreau, M., et al., "Portable and Efficient Parallel Computing Using the BSP Model," IEEE Transactions on Computers 48(7): 670-689, 1999.

Gregor, D., et al., "Lifting Sequential Graph Algorithms for Distributed-Memory Parallel Computation," in Proc. Of Parallel Object-Oriented Scientific Computing (POOSCJ, 15 pages, Jul. 2005.

Gregor, D., et al., "The Parallel BGL: A Generic Library for Distributed Graph Computations," in Proc. 2005 ACM SIGPLAN Conf. on Object-Oriented Prog., Syst., Lang., and Applications (OOPSLA'05), pp. 423-437, Oct. 2005.

Hagberg, A., et al., "Exploring Network Structure, Dynamics, and Function using NetworkX," in Proc. 7th Python in Science Conf., pp. 11-15, 2008.

Hill, J., et al., "BSPlib: The BSP programming library," Parallel Computing 24:1947-1980, 1998.

Isard, M., et al., "Dryad: Distributed Data-Parallel Programs from Sequential Building Blocks," in Proc. European Conf. on Computer Syst., pp. 59-72, 2007.

Kang, F., et al., "Correlated Label Propagation with Application to Multi-label Learning," Proceedings of the 2006 IEEE Computer Society Conference on Computer Vision and Pattern Recognition (CVPR'06), 2006, pp. 1719-1726.

Kang, U., et al., "PEGASUS: A Peta-Scale Graph Mining System—Implementation and Observations," in Proc. Intl. Conf. Data Mining, pp. 229-238, 2009.

Lumsdaine, A., et al., "Challenges in Parallel Graph Processing," Parallel Processing Letters 17:5-20, 2007.

Madduri, K., et al., "A Faster Parallel Algorithm and Efficient Multithreaded Implementations for Evaluation Betweenness Centrality on Massive Datasets," in Proc. 3rd Workshop on Multithreaded Architectures and Applications (MTAAP'09), Rome, Italy, May 2009, 8 pages.

Madduri, K., et al., "Parallel Shortest Path Algorithms for Solving Large-Scale Instances," DIMACS Implementation Challenge—The Shortest Path Problem, 39 pages, 2006.

(56) References Cited

OTHER PUBLICATIONS

Malewicz, G., "A Work-Optimal Deterministic Algorithm for the Certified Write-All Problem with a Nontrivial Number of Asynchronous Processors," SIAM J. Comput. 34(4):993-1024, 2005.
Malewicz, G., et al., "Pregel: A System for Large-Scale Graph Processing," in Comm. ACM SIGMODIPOD, Indianapolis, Indiana, Jun. 6-10, 2010, 11 pages.
Meyer, U., et al., "11-stepping: a parallelizable shortest path algorithm," Journal of Algorithms 49:114-152, 2003.
Meyer, U., et al., "Design and Implementation of a Practical I/O-efficient Shortest Paths Algorithm," in Proc. 3'd Workshop on Multithreaded Architectures and Applications (MTAAP'09), Rome, Italy, May 2009, 12 pages.
Munagala, K., et al., "I/0-Complexity of Graph Algorithms," in Proc. $10^{th}$ Annual ACM-SIAM Symp. On Discrete Algorithms, pp. 687-694, 1999.
Olston, C., et al., "Pig Latin: A Not-So-Foreign Language for Data Processing," in Proc. ACM SIGMOD Intl. Conf. on Management of Data, pp. 1099-1110, 2008.
Pike, R., et al., "Interpreting the data: Parallel analysis with Sawzall," Scientific Programming 13(4):277-298, 2005.
Rao, D., et al., "Ranking and Semi-supervised Classification on Large Scale Graphs Using Map-Reduce," Proceedings of the 2009 Workshop on Graph-based Methods of Natural Language Processing, ACL-IJCNLP 2009, pp. 58-65.
Thorup, M., "Undirected Single-Source Shortest Paths with Positive Integer Weights in Linear Time," J. ACM 46(3):362-394, May 1999.
Valiant, L., "A Bridging Model for Parallel Computation," Comm. ACM 33(8):103-111, 1990.
Wikipedia, "Bulk synchronous parallel," 3 pages, [online] [retrieved on Mar. 10, 2010] retrieved from the internet <http://en.wikipedia.orq/w/index.php?title=Bulk_synchronous_parallel&oldid=349030784>.
Wikipedia, "Distributed computing," 8 pages, [online] [retrieved Mar. 23, 2010] retrieved from the internet <http://en.wikipedia.org/w/index.php?title=Distributed_computing&oldid=351626983>.
Yoo, A., et al., "A Scalable Distributed Parallel Breadth-First Search Algorithm on BlueGene/L," in Proc. 2005 ACM/IEEE Conf. on Supercomputing (SC'05), pp. 25-43, 2005.
Yu, Y., et al., "DryadLINQ: A System for General Purpose Distributed Data-Parallel Computing Using a High-Level Language," in Proc. $8^{th}$ USENIX Symp. On Operating Syst. Design and Implementation, pp. 10-14, 2008.
Ziv, A., et al., "An On-Line Algorithm for Checkpoint Placement," IEEE Transactions on Computers 46(9):976-985, Sep. 1997.

\* cited by examiner

DATA STORAGE IN A GRAPH PROCESSING SYSTEM

CROSS-REFERENCE TO RELATED APPLICATIONS

This application is a continuation of U.S. application Ser. No. 13/353,556, filed Jan. 19, 2012, which claims the benefit of U.S. Provisional Application No. 61/477,559, filed Apr. 20, 2011, and U.S. Provisional Application No. 61/483,183, filed May 6, 2011. The above-mentioned applications are hereby incorporated herein by reference.

BACKGROUND

Technical Field

This invention pertains in general to distributed computing and in particular to graph processing using a distributed computer system.

Background Information

A distributed computing system includes multiple autonomous computers that communicate through a network. The computers interact with each other via the network to solve a common problem. For example, a complex problem can be divided into many smaller, less complex problems, and solved in parallel by the multiple computers in the distributed system.

Graph processing is a type of problem that is well-suited for solving using distributed systems. In graph processing, a computing problem is represented by a graph having a set of vertices connected by a set of edges. The graph can be used to model a real-world condition, and then the graph processing can act on the graph to analyze the modeled condition. For example, the World Wide Web can be represented as a graph where web pages are vertices and links among the pages are edges. In this example, graph processing can analyze the graph to provide information to a search engine process that ranks search results. Similarly, a social network can be represented as a graph and graph processing can analyze the graph to learn about the relationships in the social network. Graphs can also be used to model transportation routes, paths of disease outbreaks, citation relationships among published works, and similarities among different documents.

Efficient processing of large graphs is challenging. Graph processing often exhibits poor locality of memory access, very little work per vertex, and a changing degree of parallelism over the course of execution. Distribution over many computers exacerbates the locality issue, and increases the probability that a computer will fail during computation. These challenges continue to occur and are growing in significance as graph processing is used to model more real-world conditions and the sizes of the graphs increase.

SUMMARY OF THE INVENTION

The above and other needs are met by a method, a non-transitory computer-readable storage medium and a system for maintaining and modifying graph data. Embodiments of the method comprise maintaining data in a distributed computing system. The data describe a directed graph representing relationships among items. The directed graph models a condition that has an associated problem and the directed graph has graph components with associated data fields. The relationships among the items are analyzed to identify a solution to the problem. The analysis includes identifying a request to change a data field associated with a graph component responsive to an operation performed during the analysis. The request includes a new value for the data field. The new value is compared with an existing value of the data field associated with the graph component. The data field in the distributed computing system is modified based on the comparison.

Embodiments of the non-transitory computer-readable storage medium store executable computer program instructions. The computer program instructions include instructions for maintaining data in a distributed computing system. The data describe a directed graph representing relationships among items. The directed graph models a condition that has an associated problem and the directed graph has graph components with associated data fields. The computer program instructions further include instructions for analyzing the relationships among the items to identify a solution to the problem. The analysis includes identifying a request to change a data field associated with a graph component responsive to an operation performed during the analysis. The request includes a new value for the data field. The analysis further includes comparing the new value with an existing value of the data field associated with the graph component. The analysis further includes modifying the data field in the distributed computing system based on the comparison.

Embodiments of the system comprise a processor and a non-transitory computer readable storage medium storing processor-executable computer program instructions. The computer program instructions include instructions for maintaining data in a distributed computing system. The data describe a directed graph representing relationships among items. The directed graph models a condition that has an associated problem and the directed graph has graph components with associated data fields. The computer program instructions further include instructions for analyzing the relationships among the items to identify a solution to the problem. The analysis includes identifying a request to change a data field associated with a graph component responsive to an operation performed during the analysis. The request includes a new value for the data field. The analysis further includes comparing the new value with an existing value of the data field associated with the graph component. The analysis further includes modifying the data field in the distributed computing system based on the comparison.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF DRAWINGS

Figure (FIG. 1 is a high-level block diagram of a computing environment, according to one embodiment.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

Figure 1:
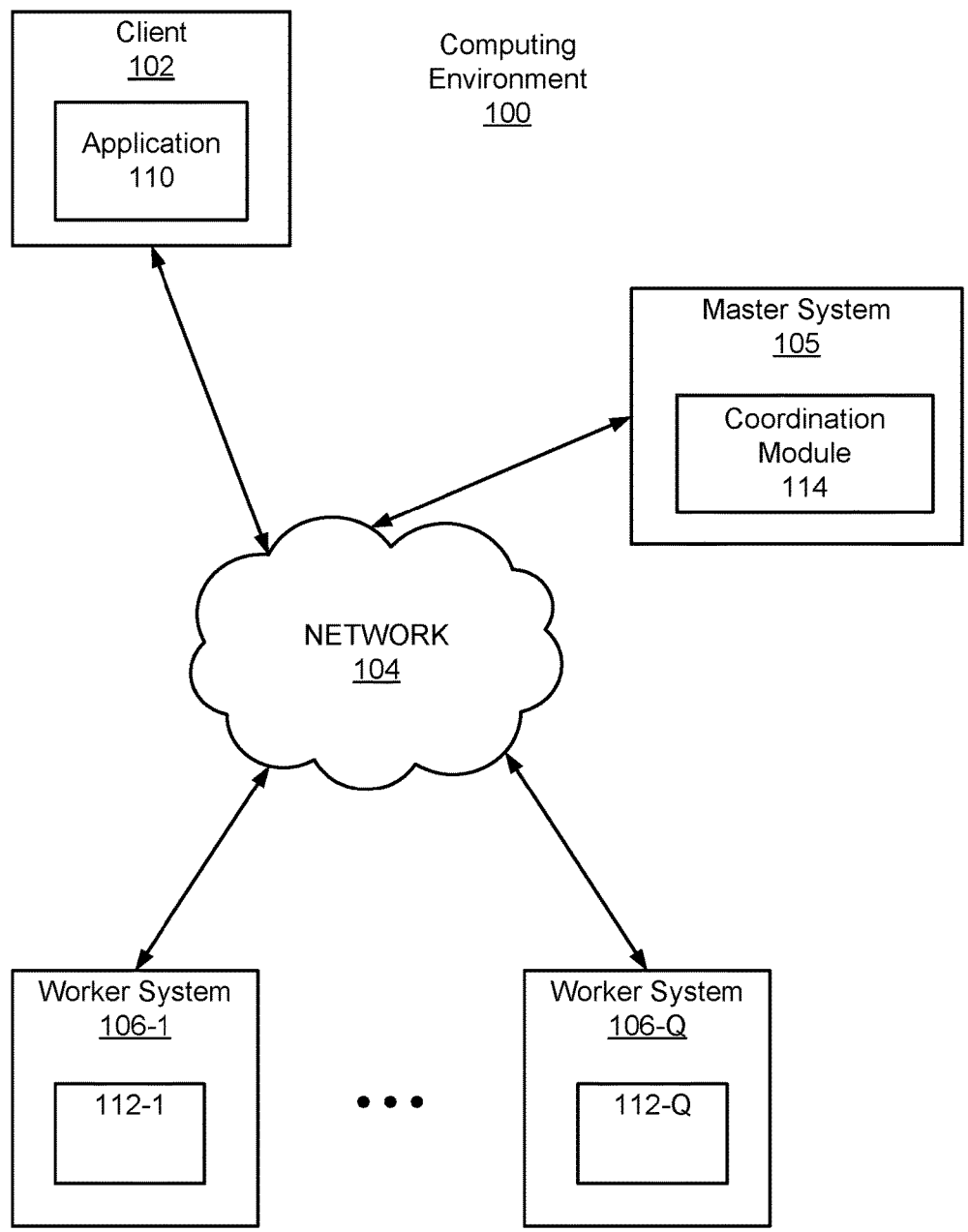

FIG. 1 is a high-level block diagram of a computing environment 100 for performing scalable fault-tolerant processing of large scale graphs. FIG. 1 illustrates a client 102, a master system 105 and worker systems 106 connected by a network 104. Collectively, the computing environment 100 is used to define a graph modeling real-world conditions as a set of relationships among a tangible set of items, such as documents and links on the Internet, transportation routes, or a social graph. In addition, the computing environment 100 is used to analyze the modeled conditions in order to solve one or more real-world problems associated with the conditions. This analysis may apply one or more algorithms to the graph, such as algorithms for shortest path computations, clustering, web page ranking, graph cutting, etc.

At a high-level, the client 102 is used to provide graph data describing the graph and to specify an algorithm to be performed on the graph data. The graph itself is represented as a set of vertices connected by a set of directed edges. As used herein, the vertices and the edges of a graph are collectively referred to as graph components. The master system 105 assigns partitions of the graph data to the worker systems 106. The worker systems 106 perform the specified algorithm on the partitions of the graph data within their respective ambits.

In more detail, the client 102 specifies a directed graph in which each vertex is uniquely identified by a string vertex identifier. Each vertex is also associated with a modifiable, user-defined value. The directed edges are associated with their source vertices, and each edge has a modifiable, user-defined value and a target vertex identifier. Vertices communicate directly with one another by sending messages, each of which includes a message value and the name of the destination vertex. In some embodiments, the vertices send requests to other vertices to add, modify or remove vertices and edges.

A typical computation includes initialization of a graph and execution of the algorithm on multiple systems. The algorithm performs a sequence of supersteps separated by global synchronization points until the algorithm terminates and produces an output. Within each superstep, the vertices compute in parallel, each executing a defined function that expresses the logic of the algorithm. A vertex can modify its state or that of its outgoing edges, receive messages sent to it in the previous superstep, send messages to other vertices (to be received in the next superstep), or even mutate the topology of the graph.

The algorithm terminates based on every vertex voting to halt. In superstep 0 (the initial superstep), every vertex is in the active state; all active vertices participate in the computation of any given superstep. A vertex deactivates itself by voting to halt. Halting means that the vertex has no further work to do unless triggered externally, and that vertex will not execute in subsequent supersteps unless it receives a message. If reactivated by a message, a vertex must explicitly deactivate itself again. The algorithm as a whole terminates when all vertices are simultaneously inactive and there are no messages in transit.

The output of the algorithm is a set of values explicitly output by the vertices. For example, a clustering algorithm might generate a small set of disconnected vertices selected from a large graph. In another example, a graph mining algorithm might simply output aggregated statistics mined from the graph. The output represents a solution to the real-world problem associated with the modeled conditions involving the set of relationships among the set of items. For example, the output might be a set of search results, a transportation route, an analysis of the spread of a disease, or a recommendation for an item.

Turning now to the specific entities illustrated in FIG. 1, the client 102 is a computing device with a processor and a memory that includes an application 110 for providing the master system 105 with a user program and graph data. The user program defines the algorithm to perform on the graph data. An example of the algorithm is a shortest path algorithm that finds a shortest path between a single source vertex and every other vertex in the graph. The application 110 sends a copy of the user program to the master system 105. The application 110 also sends graph data or a location of the graph data to the master system 105.

The master system 105 is likewise a computing device with a processor and a memory. The master system 105 receives graph data and a user program from the client 102, assigns partitions of the graph data to the worker systems 106, provides copies of the user program to the worker systems 106, coordinates the parallel execution of the user program on the worker systems 106 and reports results of the execution to the client 102. The master system 105 includes a coordination module 114 that executes a copy of the user program that acts as a master or coordinator for the execution of the copies of the user program on the worker systems 106.

The coordination module 114 maintains a list of worker systems 106 that participate in a computation. The worker systems 106 send registration messages to the master system 105 and the coordination module 114 registers the worker systems 106 by assigning unique identifiers to the worker systems 106. The coordination module 114 maintains a list of the registered worker systems 106 which includes the identifiers of the registered worker systems 106 and the addressing information of the registered worker systems 106. For a respective registered worker system 106, the list includes information identifying one or more assigned graph partitions. In some embodiments, the coordination module 114 sends each worker system 106 the list of the registered worker systems 106.

The coordination module 114 determines the number of partitions the graph will have, assigns zero or more partitions to each worker system 106 and sends each worker system 106 its assigned zero or more partitions. A partition of a graph includes a subset of the vertices and edges of the graph. The number of partitions may be specified in the user program or determined by a partition function stored in the coordination module 114. For example, the default partitioning function may be a hash of a vertex identifier modulo N, where N is the number of partitions. The master system 105 is not assigned any portion of the graph.

The coordination module 114 sends each worker system 106 a copy of the user program and initiates the execution of the user program on the worker systems 106. More specifically, the coordination module 114 signals the beginning of a superstep. The coordination module 114 maintains statistics about the progress of a computation and the state of the graph, such as the total size of the graph, a histogram of its distribution of out-degrees, the number of active vertices, the timing and message traffic of recent supersteps.

In some embodiments, the coordination module 114 also handles fault tolerance. Fault tolerance is achieved through checkpointing. At the beginning of a superstep, the coordination module 114 instructs the worker systems 106 to save the state of their partitions to persistent storage, including vertex values, edge values, and incoming messages. Worker failures are detected through messages that the coordination module 114 periodically sends to the worker systems 106. If the coordination module 114 does not receive a reply message from a worker system 106 after a specified interval, the coordination module 114 marks that worker system 106 as failed. If a worker system 106 does not receive a message from the coordination module 114 after specified time interval, the worker system 106 terminates its processes. When a worker system 106 fails, the current state of the partitions assigned to the worker system 106 is lost. In order to recover from a worker system 106 failure, the coordination module 114 reassigns graph partitions to the currently available set of worker systems 106 at the beginning of a superstep. The available set of worker systems 106 reload their partition states from the most recent available checkpoint at the beginning of a superstep. The most recent available checkpoint may be several supersteps earlier than the latest superstep completed by any worker system 106 before the failure, which results in the missing supersteps being repeated. The frequency of checkpointing may be based on a mean time of failure which thereby balances check pointing cost against expected recovery cost. The frequency of checkpointing may also be based on actual computation times. For example, the computation time may be the average time to perform a superstep or the computation time of previously performed supsersteps.

After the supersteps are finished, the coordination module 114 aggregates results from the worker systems 106 and sends the results to the client 102. In some embodiments, the results include a set of values explicitly output by the vertices. In some embodiments, the results include a directed graph.

A worker system 106 is a computing device with a processor and a memory. The worker systems 106 and the master system 105 are similar types of systems in one embodiment. A worker system 106 includes a worker module 112 that stores one or more partitions. The worker module 112 also stores and executes a copy of the user program on the one or more partitions stored on the worker system 106.

The worker module 112 executes supersteps of a user program in response to receiving instructions from the master system 105. During a superstep, the worker module 112 executes an algorithm for each active vertex in the one or more partitions stored on the worker module 112 and messages from previous supersteps are sent to each active vertex. A vertex that is active during a superstep may send messages to other vertices in order to obtain information about other vertices or edges, to add or remove vertices or edges and to modify vertices or edges. When the superstep is finished, the worker module 112 sends a message to the master system 105 indicating the number of vertices that will be active in the next superstep. The superstep continues as long as there are active vertices or there are messages in transit. When the supersteps are finished, the worker module 112 sends the results generated from the user program to the master system 105.

The worker module 112 stores the state of its assigned one or more partitions. This may include the state of each vertex in the one or more partitions where the state of each vertex consists of its current value, a list of its outgoing edges (which includes the vertex name for the edge's destination and the edge's current value), a queue containing incoming messages, and a flag specifying whether the vertex is active.

The network 140 represents the communication pathways between the client 102, the master system 105 and the worker systems 106. In one embodiment, the network 140 uses standard Internet communications technologies and/or protocols. Thus, the network 140 can include links using technologies such as Ethernet, 802.11, integrated services digital network (ISDN), asynchronous transfer mode (ATM), etc. Similarly, the networking protocols used on the network 140 can include the transmission control protocol/Internet protocol (TCP/IP), the hypertext transport protocol (HTTP), the simple mail transfer protocol (SMTP), the file transfer protocol (FTP), etc. The data exchanged over the network 140 can be represented using technologies and/or formats including the hypertext markup language (HTML), the extensible markup language (XML), etc. In addition, all or some links can be encrypted using conventional encryption technologies such as the secure sockets layer (SSL), Secure HTTP (HTTPS) and/or virtual private networks (VPNs). In another embodiment, the entities can use custom and/or dedicated data communications technologies instead of, or in addition to, the ones described above.

Figure 2:
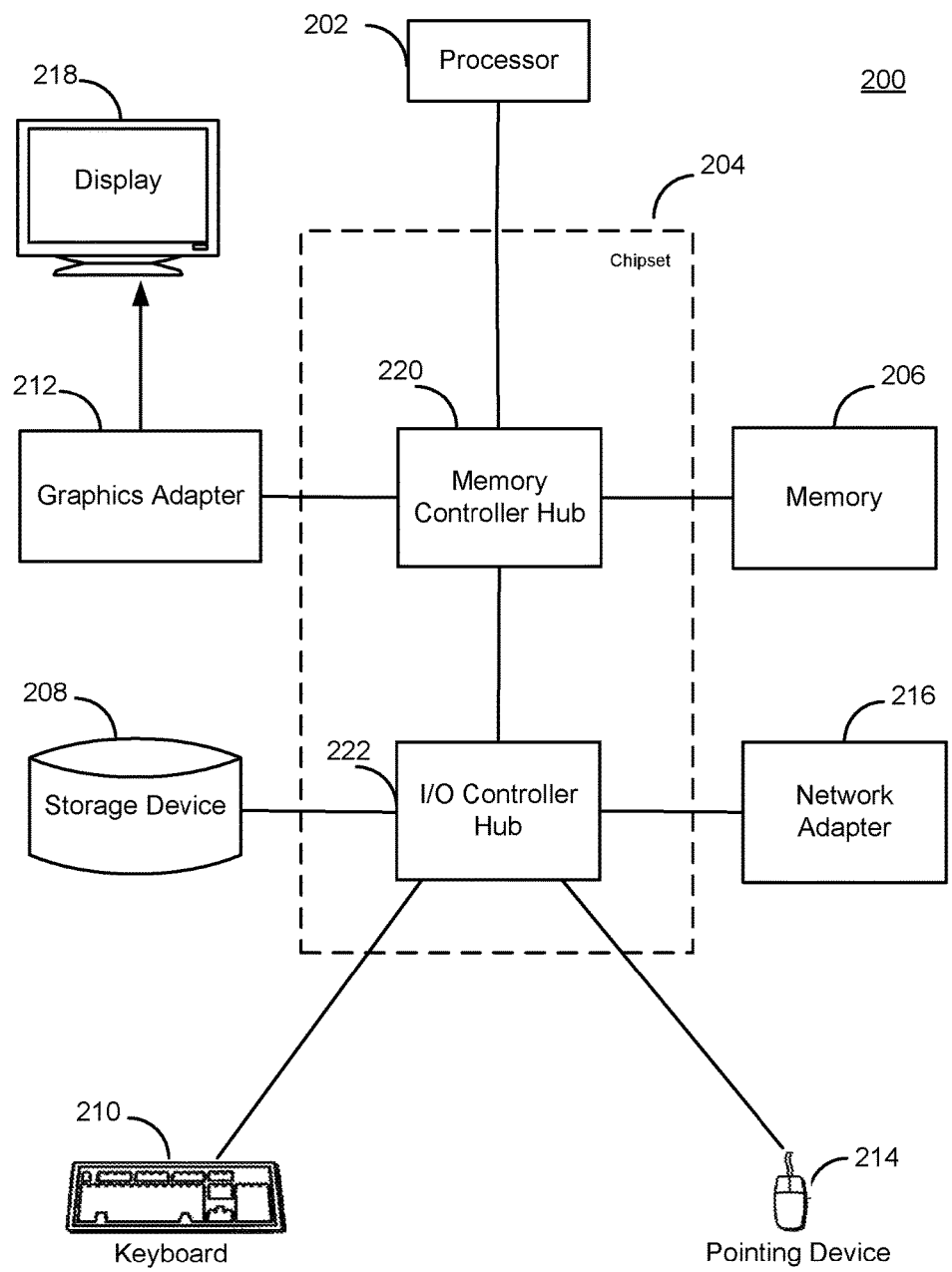
FIG. 2 is a high-level block diagram illustrating an example of a computer, according to one embodiment.

FIG. 2 is a high-level block diagram illustrating physical components of a computer 200 used as part of the client 102, master system 105 and/or worker system 106 from FIG. 1, according to one embodiment. Illustrated are at least one processor 202 coupled to a chipset 204. Also coupled to the chipset 204 are a memory 206, a storage device 208, a keyboard 210, a graphics adapter 212, a pointing device 214, and a network adapter 216. A display 218 is coupled to the graphics adapter 212. In one embodiment, the functionality of the chipset 204 is provided by a memory controller hub 220 and an I/O controller hub 222. In another embodiment, the memory 206 is coupled directly to the processor 202 instead of the chipset 204. In some embodiments, memory 206 includes high-speed random access memory, such as DRAM, SRAM, DDR RAM or other random access solid state memory devices.

The storage device 208 is any non-transitory computer-readable storage medium, such as a hard drive, compact disk read-only memory (CD-ROM), DVD, or a solid-state memory device. The memory 206 holds instructions and data used by the processor 202. The pointing device 214 may be a mouse, track ball, or other type of pointing device, and is used in combination with the keyboard 210 to input data into the computer 200. The graphics adapter 212 displays images and other information on the display 218. The network adapter 216 couples the computer 200 to the network 140.

As is known in the art, a computer 200 can have different and/or other components than those shown in FIG. 2. In addition, the computer 200 can lack certain illustrated components. In one embodiment, a computer 200 acting as a server may lack a keyboard 210, pointing device 214, graphics adapter 212, and/or display 218. Moreover, the storage device 208 can be local and/or remote from the computer 200 (such as embodied within a storage area network (SAN)).

As is known in the art, the computer 200 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 208, loaded into the memory 206, and executed by the processor 202.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

Figure 3:
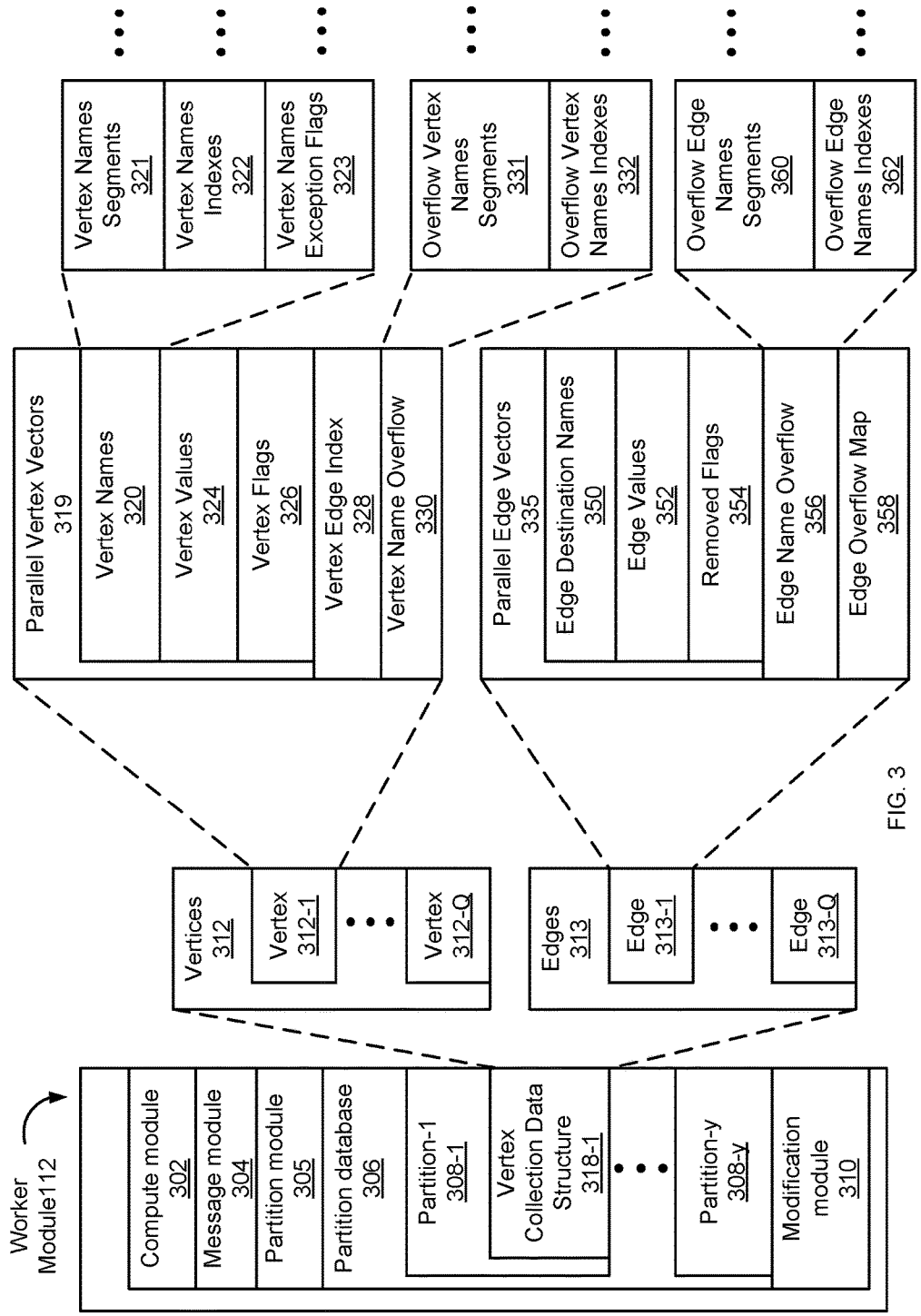
FIG. 3 is a high-level block diagram illustrating modules within a worker system, according to one embodiment.

FIG. 3 is a high-level block diagram illustrating modules within the worker module 112 of a worker system 106, according to one embodiment. The modules store one or more partitions of a graph, execute a copy of the user program and modify the one or more partitions of the graph responsive to operations of the user program.

The worker module 112 includes a partition database 306 that stores one or more partitions 308 of a graph. A partition 308 stores information for a subset of the vertices and edges of a graph. A partition 308 is stored as a vertex collection data structure 318. The vertex collection structure 318 stores information for the vertices 312 and the edges 313 of a partition 308.

The data for a vertex 312 includes several parallel vertex vectors 319, vertex edge index vectors 328 and vertex name overflow vectors 330. The parallel vertex vectors 319 includes a vertex names vector 320, a vertex values vector 324 and a vertex flags vector 326. A vector is a dynamic array which is a variable size data structure that allows elements to be added or removed. Respective positions in the parallel vectors contain values corresponding to various data fields of a respective vertex. The data field may be a vertex name, vertex value, vertex flag or exception flag. By using parallel vectors, the vertex collection data structure 318 does not need an additional table or index to organize the data fields of a vertex thereby saving storage space.

Figure 4A:
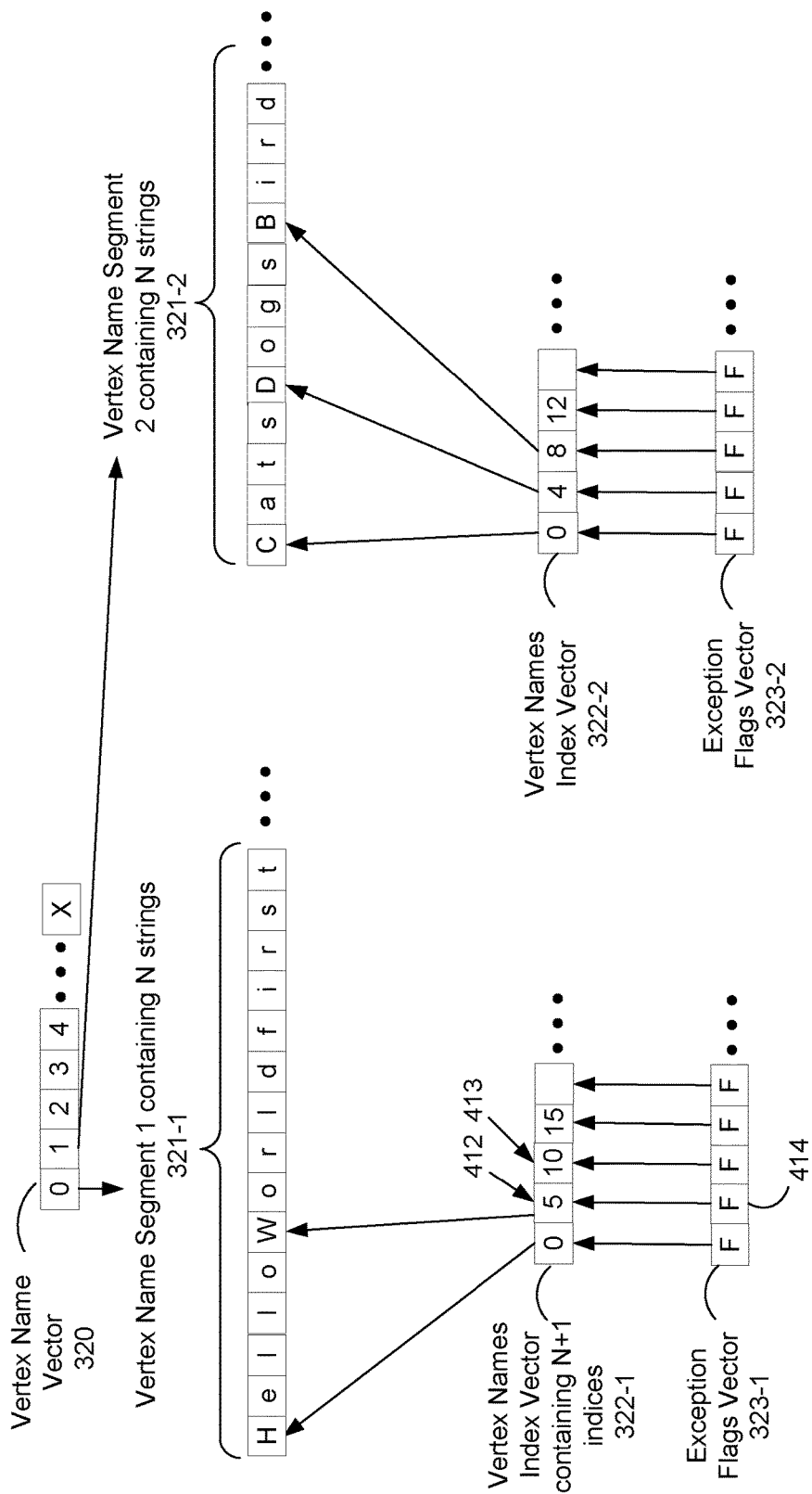
FIG. 4A illustrates aspects of a vertex collection data structure, according to one embodiment.

The vertex names vector 320 stores vertex names that identify respective vertices. The vertex names vector 320 includes vertex name segments 321. For example, as shown in FIG. 4A, vertex name vector 320 includes vertex name segment 1 321-1 and vertex name segment 2 321-2. The vertex names vector 320 also includes a vertex name index 322 and a vertex name exception flag vector 323 for each vertex names segment 321. For example, as shown in FIG. 4A, vertex name index vector 322-1 and exception flags vector 323-1 correspond to vertex name segment 1 321-1. A vertex names segment 321 includes a string of concatenated substrings. In some embodiments, the substrings correspond to vertex names. Strings and substrings are sequences of symbols or characters. For example, as shown in FIG. 4A, vertex names segment 1 321-1 includes the string "HelloWorldfirst" which consists of substrings "Hello", "World" and "first." In this example, the substring "Hello" may be a vertex name and the substring "World" may be another vertex name. In some embodiments, a vertex name segment 321 includes N number of strings where N is a power of two. For example, a vertex name segment 321 may include 1024 strings. In some embodiments, a vertex name segment 321 has at least four bytes allocated for each string in the segment. In some embodiments, the vertex name segments 321 of a vertex name vector 320 include the same number of strings. For example, each vertex name segment 321 may include 1024 strings. In some embodiments, the name values stored in the vertex names vector 320 are stored in alphabetical order. Storage space is saved and efficiently used by storing the data fields for a vertex in distinct vectors because the data fields (e.g., flags, values and names) are different sizes. Keeping the vectors separate avoids space costs for packing. Also, by having parallel vectors a vertex always has the same index thereby saving the space costs of multiple indices.

A respective vertex names index vector 322 stores index values that identify strings in a corresponding vertex name segment 321. For example, in FIG. 4A, the vertex names index vector 322-1 includes values identifying locations of substrings in the vertex name segment 1 321-1. In some embodiments, a respective vertex names index 322 includes values that identify starting positions of substrings in a vertex name segment 321. Stated in another way, a vertex names index vector 322 includes values identifying the offsets of the starting positions of substrings in a vertex name segment 321. For example, in FIG. 4A, value 412 indicates that the second substring of vertex name segment 1 321-1 starts at the sixth character position. The ending position of a respective substring is identified by checking the next index value in the vertex names index vector 322 for the starting position of the next substring. Using the previous example, the end of the substring identified by value 412 is identified by checking value 413. Each vertex names index vector 322 includes N+1 index values where N is the number of substrings in a vertex segment 321.

A two-step process is used to get a particular vertex name using a vertex names index vector 322. In the first step, a respective index value i is divided by the vertex name segment size (e.g., 1024) to get a vertex name segment number. The vertex name segment number identifies a vertex name segment in the vertex names vector 320. In the second step, the remainder of the division is used to obtain the particular vertex name from the vertex name segment identified by the vertex name segment number. The remainder may identify a position in the vertex names index vector 322 that corresponds to the vertex name segment identified by the vertex name segment number. The position in the vertex names index vector 322 includes a value that identifies the particular vertex name. In some embodiments, a respective vertex names index vector 322 includes N+1 indices where N is the number of values in a corresponding vertex names segment 321.

A respective exception flags vector 323 includes an exception flag for each substring identified by the values of a respective vertex names index 322. For example, if vertex names index 322 includes values for N substrings then there are N exception flags. In some embodiments, the exception flags vector 323 is a Boolean vector where each position of the vector is set to true or false. Each position of an exception flag vector 323 corresponds to a position in a vertex names index 322 and a flag at a position of the exception flag vector 323 corresponds to the substring identified by the value in the position of the vertex names index 322. For example, as shown in FIG. 4A, the first position (or index position zero) of the exception flag vector 323-1 corresponds to the first position (or index position zero) of the vertex names index 322-1, the second position (or index position one) of the exception flag vector 323-1 corresponds to the second position (or index position one) of the vertex names index 322-1 and so on.

In some embodiments, an exception flag indicates whether a substring of a vertex names segment 321 stores exception information. The exception information indicates whether a substring has been removed, whether a substring is less than four bytes, whether a substring has been placed in an overflow string chunk and whether a substring has been replaced by a shorter substring. In FIG. 4A, the flag 414 is set to false which indicates that the substring ("World") identified by value 412 does not include exception information. Messages requesting a sub string of a vertex name segment 321 first check the corresponding exception flag in the exception flag vector 323 in order to determine whether there is exception information for the substring.

Figure 4B:
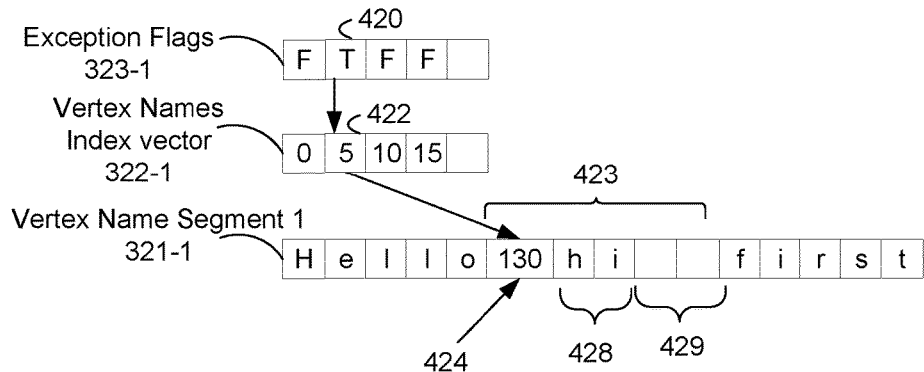
FIG. 4B illustrates aspects of a vertex collection data structure, according to one embodiment.

In some embodiments, the exception information in a portion of a vertex name segment 321 includes information identifying a length of a substring stored in the portion of the vertex name segment 321. In this case, the portion of the vertex name segment 321 includes both exception information and a string. The exception information is placed in the first byte of the portion and the new string is inserted into the portion starting at the second byte. This may happen when a substring of a vertex name segment 321 is less than four bytes. As discussed above, in some embodiments, a vertex name segment 321 has at least four bytes for each string. This may also happen when a substring of a vertex name segment 321 has been replaced with a new string that is shorter in length than the replaced substring. For example, the string "World" may be replaced by the string "hi." In this example, the portion previously occupied by the string "World," which includes five bytes, now stores the string "hi" and exception information. The exception information is placed in the first byte of the location previously occupied by "World." The new string "hi" is placed in the portion starting at the second byte. Remaining spaces in the portion are empty. For example, as shown in FIG. 4B, the first byte of portion 423 contains exception information 424, the second and third byte contain the string "hi" and the last two bytes 429 are empty. In this example, the new string and the exception information take up three bytes of the five byte portion. The high bit of the exception information is set and the low bits contain the length of the new string. For example, in FIG. 4B, the exception information 424 includes a value of 130, which has a high bit set (i.e., 128) and has the remaining low bits set to 2 which indicates the length of the string "hi" 429. By including the length of the substring in the exception information, processes that request access to the substring do not have to calculate the length of the substring.

Figure 4C:
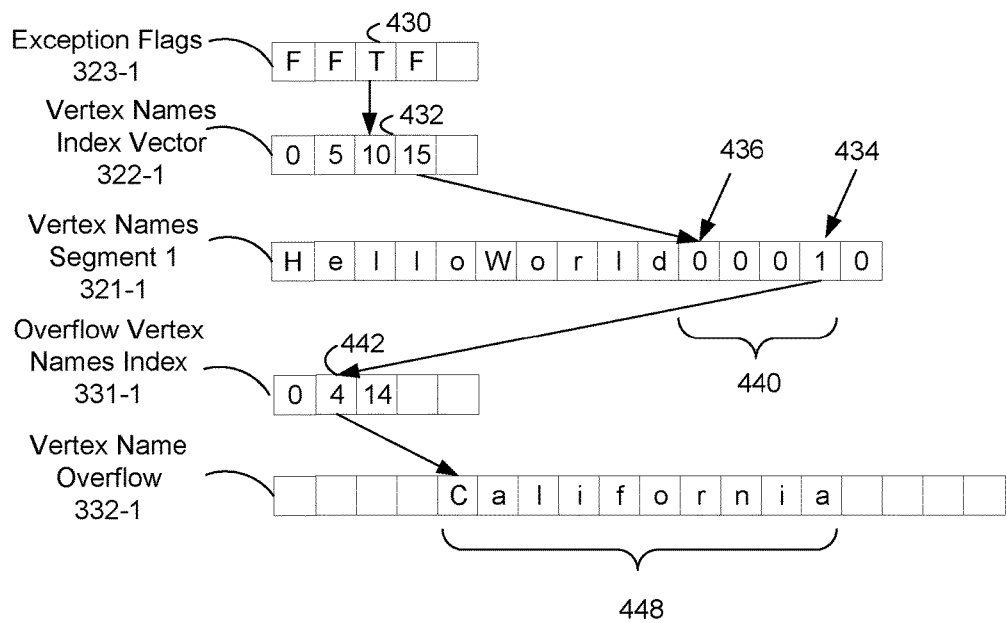
FIG. 4C illustrates aspects of a vertex collection data structure, according to one embodiment.

In some embodiments, the exception information in a portion of a vertex name segment 321 includes information identifying a location of a string. This may occur when a string has been replaced by a longer string. For example, in the context of FIG. Google Inc.*EWC*, the string "first" in vertex names segment 321-1 has been replaced by the string "California" 448. The string "California" 448 which requires ten bytes of space does not fit in the five byte space previously occupied by the string "first." In this example, the string "first" in the vertex names segment 1 321-1 is replaced with exception information 440. The exception information 440 takes up the first four bytes of the five byte space previously occupied by the string "first." In the example of FIG. 4C, the four bytes of the exception information 440, except for the high bit 436 of the first byte, include a value 434 identifying a position in an overflow vertex names index 331-1. In this example, the high bit 436 is not set. The position in the overflow names index 331 includes a value identifying a location of a string in a vertex name overflow vector 332. For example, as shown in FIG. 4C, the exception information 440 includes a value 434 that identifies a position in the overflow vertex names index 331-1 and the position in the overflow vertex names index 331-1 includes a value 442 that identifies the location of the string "California" 448." In some embodiments, the high bit of the exception information is not set in order to indicate that a substring is not located at a corresponding portion of a vertex name segment 321. In the context of FIG. 4C, the overhead information 440 takes up four bytes of a five byte space and the unused portions of the space are left blank.

The vertex values vector 324 stores user defined data that may be of any data type. A same index value in the vertex names vector 320, the vertex values vector 324, vertex flags vector 326 and vertex edge index 328 is used to identify data fields for a respective vertex. As discussed above, the index value is converted to an index position in the vertex names index vector 322 or the exception flags vector 323 by dividing the segment size to identify a segment and using the remainder of the division as the index position in the identified segment. The vertex values in the vertex values vector 324 are stored by vertex order.

The vector of vertex flags 326 includes one or more flags for each vertex 312. In some embodiments, the vector of vertex flags 326 stores flags to indicate whether a vertex is active or inactive. In some embodiments, the vector of vertex flags 326 stores flags to indicate whether a respective vertex has been modified. In some embodiments, there may be two vectors of vertex flags 326 for each vertex 312, where one vector stores modification flags for the respective vertices 312 and where the other vector stores flags to indicate whether respective vertices 312 are active or inactive.

The vertex name overflow vector 330 includes overflow vertex names segments 331 and overflow vertex names indexes 332 for the overflow vertex names segments 331. As discussed above, a respective overflow vertex names segment 331 stores strings and a respective overflow vertex names index 332 identifies strings in respective overflow vertex names segment 331.

The vertex edge index 328 identifies edges 313 corresponding to a vertex 312. More specifically, the vertex edge index 328 is a vector of indices into the parallel edge vectors 335, so that the edges for vertex i are those from position i in vertex edge index 328 up to and not including the edges identified by position i+1. The vertex edge index 328 has N+1 indices where N is the number of strings in the vertex names vector 320.

An edge 313 includes parallel edge vectors 335, edge name overflow tables 356 and an edge overflow map 359. The parallel edge vectors 335 includes edge destination names vector 350, edge values vector 352 and removed flags vector 354. In some embodiments, the values in the edge destination name vector 350 are stored in vertex order. For example, the values for vertex 1 come before those of vertex 2 and so on. The edge destination names vector 350 stores vertex name segments 321 which stores vertex names. The edge values vector 352 is a vector of user defined values.

Figure 4D:
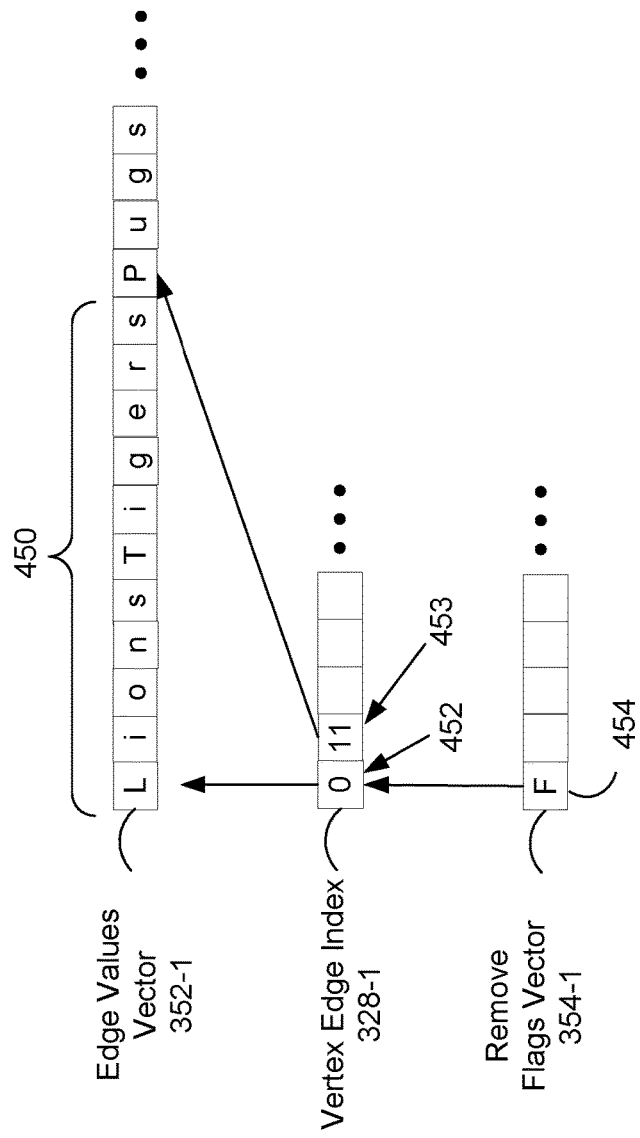
FIG. 4D illustrates aspects of a vertex collection data structure, according to one embodiment.

The edges 313 are associated with their source vertices by the vertex edge index 328 discussed above. For example, as shown in FIG. 4D, the index value 452 (at index position zero) and the index value 453 (at index position one) identify the edge values 450 in the edge values vector 352-1 for a respective vertex corresponding to index position zero. In this example, the respective vertex is identified by a value contain in index position zero of a respective vertex names index 322.

The removed flags vector 354 contains flags that are set if the corresponding edge is removed. Vertices with removed edges can replace the removed edges rather than using an overflow structure. When an edge is removed, the corresponding edge name is replaced with exception information that has its high bit to set followed by zeros (e.g., the first byte set to 128 followed by zeros).

The edge name overflow vector 356 stores replaced edge destination names that are too long to fit in place of original edge names. Inserting longer edges into the original edges 313 could potentially require a large scale reorganization of the vertex collection data structure 318 which would require a large amount of processing time. The edge name overflow vector 356 includes overflow edge name segments 360 and overflow edge names indexes 362 for the overflow edge names segments 360. The edge name overflow vector 356 is similar to the vertex name overflow vector 330 described above.

Figure 4E:
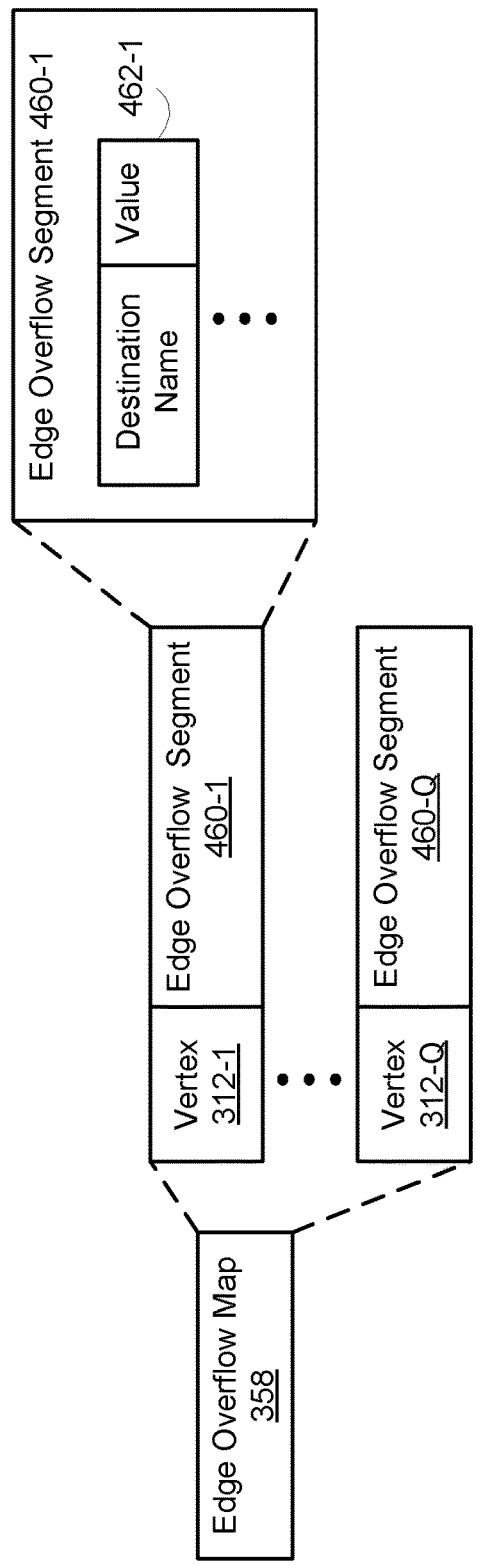
FIG. 4E illustrates aspects of a vertex collection data structure, according to one embodiment.

Referring to FIG. 4E, the edge overflow map 358 provides a mapping from vertices 312 to edge overflow segments 460. Finding the edges for a respective vertex requires looking at both the parallel edge vectors 335 (which includes the edge destination names 350, edges values 352 and the removed flags 354) and the edge overflow map 358. An edge overflow segment 460 is an individual vector of edges for a vertex and is not a part of a larger vector. Edges are stored in an edge overflow segment when the edges are added after the original edges are stored. Each edge name overflow segment vector 460 includes pairs 462 of destination names and edge values.

The vertex collection data structure 318 described above provides a compact data structure for storing graph data. The overall result is that the amount of extra information necessary to store the graph data is minimal. By using a minimal amount of space to store graph data, the likelihood is increased that the graph can fit into faster memory such as high-speed random access memory as opposed to slower optical disk storage devices.

The worker module 112 includes a partition module 305 that manages the data in the partition database 306. The partition module 305 receives graph data describing a partition of a graph and stores the graph data as a vertex collection data structure 318 in the partition database 306. The partition module 305 examines the graph data and inserts the vertex names into the vertex names vector 320, the vertex values into the vertex values vector 324, the edge destinations into the edge destination names vector 350 and the edge values into the edge value vector 352. The partition module 305 also sets the index values in the indexes (i.e., the vertex names indexes 322 and the vertex edge index 328) for the vertices 312. The partition module 305 also saves the state of the partitions 408 in the partition database 306 in response to messages from the master system 105.

The worker module 112 includes a modification module 310 that modifies components of a partition of a graph responsive to operations of a user program. Some algorithms need to the change the topology of the graph. A clustering algorithm, for example, might replace each cluster of vertices with a single vertex, and a minimum spanning tree algorithm might remove certain edges. The modification module 310 modifies the vertex collection data structure 318 storing the vertices and edges of a partition 308. The modifications include adding, modifying or removing a vertex or an edge. Modifying a vertex may include modifying the name of the vertex or the values of the vertex. Modifying an edge may include modifying the destination name of the edge or the values of the edge.

During execution of a superstep, vertices may send requests to other vertices to add, remove or modify vertices and edges. In some embodiments, the request to add or modify a vertex or an edge includes a new vertex or edge value and information identifying the vertex or edge. When the request is modify a vertex, the identification information includes a vertex name. When the request is to modify an edge, the identification includes an edge destination name.

When the modification module 310 receives a request to remove an edge or a vertex, the modification module 310 identifies the location of the substring corresponding to the edge or vertex, replaces the substring with exception information that has an upper bit set to false and sets the corresponding exception flag to true. For example, the modification module 310 may replace the substring with 128 followed by zeros.

When the modification module 310 receives a request to replace an edge or a vertex, the modification module 310 identifies the existing substring corresponding to the edge or vertex and compares the length of the existing substring with the length of the new string contained in the request. Based on the comparison, the new string may be equal in length to the existing substring, shorter in length than the existing substring or longer than the existing substring. When the length of the new string is equal to the length of the existing substring, the modification module 310 replaces the existing substring with the new string.

When the new string is shorter in length than the existing substring, the modification module 310 replaces the existing substring with the new string and exception information and sets an exception flag for the new string. The exception information includes the length of the new string and an indication that a string is present. The exception information for replacing strings with shorter strings has been discussed above.

When the new string is longer in length than the existing substring, the modification module 310 inserts the new string into an overflow vertex names segment 331, replaces the existing substring with exception information and sets the exception flag for the new string. The exception information includes information identifying the location of the new string. As discussed above, the exception information may identify an index position of an index for an overflow vertex names index 332, which includes a value identifying the new string in an overflow vertex names segment 331. By storing values that do not fit in the original vectors (e.g., vertex names 320 and vertex values 324) into overflow vectors (e.g., overflow vertex name segments 331), memory and processing resources are saved by not having to re-arrange elements in the original vectors.

By inserting longer strings into overflow string chunks, processing time is saved by not having to rearrange elements in a string chunk. In some embodiments, the partition module 305 periodically merges the overflow vertex names segments 331 into the vertex names vector 320.

In some embodiments, the modification module 310 reorders the vertices 312 in alphabetical order in order to avoid expensive lookups. The vertices 312 may be reordered at the end of a superstep and after vertices have been added to a partition 308.

The worker module 112 includes a compute module 302 that executes an algorithm or user-defined function of a user program for each vertex in a partition 308. The compute module 302 passes each vertex the current value of the vertex, a reference to the incoming messages and a reference to the outgoing edges of the vertex. The compute module 302 sends the result of the algorithm to the master system 105 for output.

The worker module 112 includes a message module 304 that sends messages from one vertex to another vertex during a superstep. A vertex may send messages to another vertex on a different worker system 106. The vertices may send messages to other vertices in order to obtain information about other vertices, to add or remove vertices or edges and to modify vertices and edges. In one embodiment, the message module 304 stores and manages message queues for vertices in the partitions 308 stored in the partition database 306. For each vertex, the message module 304 maintains an incoming message queue for the current superstep and an incoming message queue for the next superstep. The messages include a message value and the name of the destination vertex. The value of a message depends on the function or algorithm that generated the message. For example, in a shortest path algorithm, the message may contain information about distances of vertices.

In some embodiments, the message module 304 stores and manages an outgoing message queue for a vertex. The messages in the outgoing message queue may be transmitted once the queue reaches a threshold size. The message module 304 is also responsible for sending and responding to messages from the master system 105. As discussed above, the master system 105 periodically sends messages to the worker systems 106 to check on the status of a computation.

Figure 5:
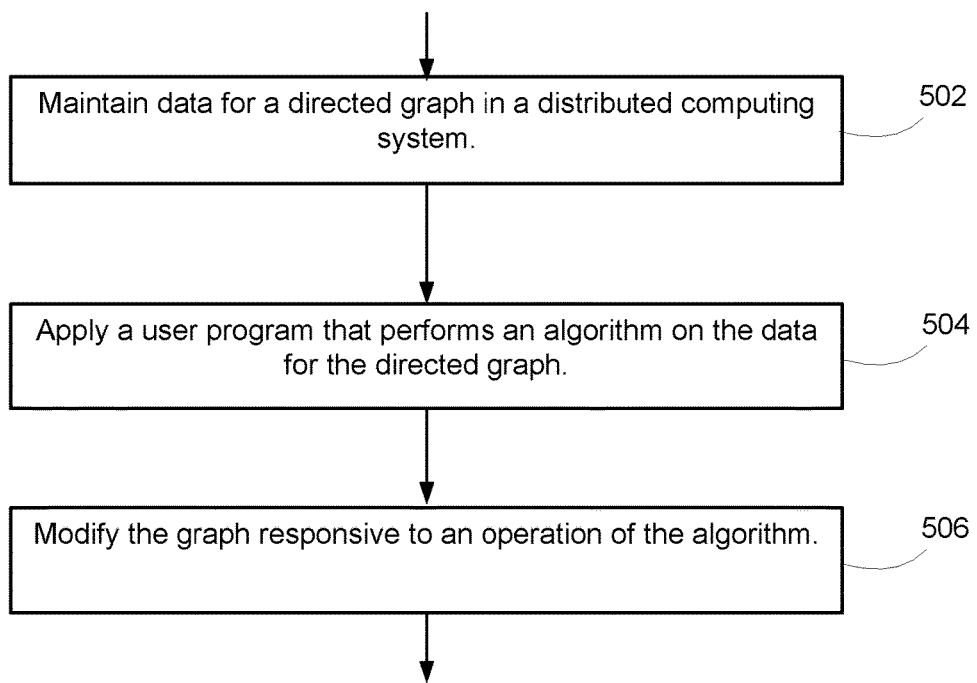
FIG. 5 is a flow diagram that illustrates a process for maintaining and modifying graph data, according to one embodiment.

FIG. 5 is a flow diagram that illustrates a process for maintaining and modifying graph data, in accordance with one embodiment. This process 500 is performed by a server system (e.g., worker system 106) having one or more processors and non-transitory memory. The non-transitory memory stores one or more programs to be executed by the one or more processors. The one or more programs include instructions for process 500.

Data for a directed graph are maintained 502 in a distributed computing system. The data describe a directed graph modeling a real-world condition having an associated problem. The directed graph describes a set of relationships among a set of items. In some embodiments, the directed graph represents relationships among a set of tangible real-world items. The directed graph has graph components with associated data fields. The graph components include vertices and directed edges connecting the vertices. The data fields describe vertex names, vertex values, edge destination names or edge values. In some embodiments, the data describe a partition of a directed graph. A partition of a graph includes a subset of the vertices and edges of the graph. The data for the graph are maintained as a vertex collection data structure 318 described above.

A user program that performs 504 an algorithm is applied on the data for the directed graph. The user program performs an algorithm on the data describing the graph to analyze the relationships among the items in order to identify a solution to a problem. The user program is executed by a compute module 302 of a worker system 106 and the user program is executed on the one or more partitions stored in the worker system 106. The analysis includes identifying a request change to a data field associated with a graph component responsive to an operation performed during the analysis. The request includes a new value for the data field. The request may be to modify or replace a vertex name, a vertex value, an edge value or an edge destination. In some embodiments, the request includes a vertex name or a destination vertex name. The modification module 310 identifies an existing value for the data field based on the information in the request. In some embodiments, the existing value and the new value are strings.

The analysis further includes comparing the new value with an existing value of the data field associated with the graph component. In some embodiments, the comparison includes comparing the length of the new value and the length of the existing value. The comparison reveals whether the new string and the existing string are of a same length, whether the new string is shorter than the existing string and whether the new string is longer than the existing string. The modification module 310 compares the existing value and the new value to produce a comparison result.

The graph is modified 506 responsive to an operation of the algorithm. The analysis includes modifying the data field in the distributed computing system based on the comparison. The modification module 310 modifies 504 the data field of the graph based on the comparison. In some embodiments, the modifying includes replacing the existing value with the new value when the comparison result reveals that the existing value and the new value are a same length.

In some embodiments, responsive to the comparison indicating that the length of the new value is equal to or less than the length of the existing value, the modifying includes replacing the existing value in the data field with the new value. In some embodiments, responsive to the comparison indicating that the length of the new value is less than the length of the existing value, the modifying further includes adding exception information to the data field. The exception information indicates the length of the new value. The modifying further includes setting an exception flag associated with the data field. The exception flag indicates that the exception information is present in the data field. By including the length of the new value in the exception information, the length of the new value does not have to be calculated thereby saving processing resources.

In some embodiments, responsive to the comparison indicating that the length of the new value is greater than the length of the existing value, the modifying includes inserting the new value into an overflow vector of data describing the directed graph. The modifying also includes replacing the existing value in the data field with exception information. The exception information identifies a location of the new value in the overflow vector. The modifying also includes setting an exception flag associated with the data field where the exception flag indicates that the exception information is present in the data field. In some embodiments, the exception information identifies a position in an index and the position in the index stores a value identifying the location in the overflow vector containing the new value.

In some embodiments, a request to add a new edge value data field to a graph component of the directed graph is identified. The graph component is a vertex of the directed graph. The original number of edge value data fields the vertex had when the directed graph was initialized is determined. A current number of edge value data fields for the vertex is determined. In response to determining that the current number of edge value data fields is equal to the original number of edge value data fields, an entry in an overflow map corresponding to the vertex is identified where the entry identifies an overflow edge set associated with the vertex. The response also includes inserting the new edge value data field into an overflow edge set. The new overflow edge set includes pairs of edge value data fields and vertex names. Thus, when a vertex has its original number of edges, new edges are added to a overflow edge set.

Some portions of the above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for processing digital documents and reformatting them for display on client devices. Thus, while particular embodiments and applications have been illustrated and described, it is to be understood that the present invention is not limited to the precise construction and components disclosed herein and that various modifications, changes and variations which will be apparent to those skilled in the art may be made in the arrangement, operation and details of the method and apparatus disclosed herein without departing from the spirit and scope as defined in the appended claims.

What is claimed is:

1. A computer-implemented method comprising:
    receiving user data and graph data at a distributed computing system, the graph data describing a graph representing a task to be performed by one or more computing devices in the distributed computing system, the graph including a plurality of vertices connected by one or more edges, each of the vertices associated with one or more data fields that are included in a vertex names vector;
    performing, by the one or more computing devices, the task using the user data and the graph data, wherein the performing comprises:
        identifying a request to change an existing value of a data field associated with a particular vertex in the graph data, the request including a new value for the data field;
        determining that a length of the new value for the data field is shorter than a length of the existing value of the data field; and
        in response to determining that the length of the new value for the data field is shorter than the length of the existing value of the data field, replacing the existing value by (i) replacing a first portion of the data field that is associated with the particular vertex with exception information that indicates the length of the new value that is shorter than the length of the existing value, (ii) replacing a second portion of the data field that is associated with the particular vertex with the new value, and (iii) updating a flag in an exception flag vector to indicate an inclusion of the exception information in the data field, the flag being located at a position in the exception flag vector that indicates a position of the data field in the vertex names vector; and
    providing, by the one or more computing devices, an output for the task, wherein the output is determined using, in part, the data field that includes the exception information.

2. The computer-implemented method of claim 1, wherein:
    a location of the exception information is provided by data stored in a vector names index vector,
    wherein the position of the flag in the exception flag vector corresponds to a position of the data stored in the vector names index vector.

3. The computer-implemented method of claim 1, wherein the graph data describing the graph representing the task to be performed by the one or more computing devices in the distributed computing system comprises data indicative of one or more of vertex names, vertex values, edge values, and edge destinations of the graph, and
    wherein the identifying the request to change the existing value of the data field comprises:
        analyzing a request to change one or more of a vertex name, a vertex value, an edge value, and an edge destination in the graph.

4. The computer-implemented method of claim 1, further comprising:
    assigning a user-defined value in the user data to the particular vertex in the graph.

5. The computer-implemented method of claim 1, wherein:
    a first portion of the data field includes a high bit of the exception information; and
    a second portion of the data field includes one or more low bits of the exception information.

6. The computer-implemented method of claim 1, further comprising:
    storing, in a first vertex flag vector, a flag indicating that the particular vector in the data field is active; and
    in response to replacing the existing value, storing, in a second vertex flag vector, a flag indicating that the particular vector in the data field has been modified.

7. The computer-implemented method of claim 1, wherein the user data provides instructions for performing one or more of (I) executing the task by the one or more computing devices, and (II) partitioning the distributed computing system.

8. The method of claim 1, wherein a portion of the exception information indicates that a remaining portion of the exception information indicates the length of the new value instead of the remaining portion of the exception information indicating a position in an overflow vector.

9. One or more non-transitory computer-readable storage media comprising instructions, which, when executed by one or more computing devices, cause the one or more computing devices to perform operations comprising:
receiving user data and graph data at a distributed computing system, the graph data describing a graph representing a task to be performed by one or more computing devices in the distributed computing system, the graph including a plurality of vertices connected by one or more edges, each of the vertices associated with one or more data fields that are included in a vertex names vector;
performing, by the one or more computing devices, the task using the user data and the graph data, wherein the performing comprises:
identifying a request to change an existing value of a data field associated with a particular vertex in the graph data, the request including a new value for the data field;
determining that a length of the new value for the data field is shorter than a length of the existing value of the data field; and
in response to determining that the length of the new value for the data field is shorter than the length of the existing value of the data field, replacing the existing value by (i) replacing a first portion of the data field that is associated with the particular vertex with exception information that indicates the length of the new value that is shorter than the length of the existing value, (ii) replacing a second portion of the data field that is associated with the particular vertex with the new value, and (iii) updating a flag in an exception flag vector to indicate an inclusion of the exception information in the data field, the flag being located at a position in the exception flag vector that indicates a position of the data field in the vertex names vector; and
providing, by the one or more computing devices, an output for the task, wherein the output is determined using, in part, the data field that includes the exception information.

10. The one or more non-transitory computer-readable storage media of claim 9, wherein:
a location of the exception information is provided by data stored in a vector names index vector,
wherein the position of the flag in the exception flag vector corresponds to a position of the data stored in the vector names index vector.

11. The one or more non-transitory computer-readable storage media of claim 9, wherein the graph data describing the graph representing the task to be performed by the one or more computing devices in the distributed computing system comprises data indicative of one or more of vertex names, vertex values, edge values, and edge destinations of the graph, and
wherein the identifying the request to change the existing value of the data field comprises:
analyzing a request to change one or more of a vertex name, a vertex value, an edge value, and an edge destination in the graph.

12. The one or more non-transitory computer-readable storage media of claim 9, wherein the operations further comprise
assigning a user-defined value in the user data to the particular vertex in the graph;
storing, in a first vertex flag vector, a flag indicating that the particular vector in the data field is active; and
in response to replacing the existing value, storing, in a second vertex flag vector, a flag indicating that the particular vector in the data field has been modified.

13. The one or more non-transitory computer-readable storage media of claim 9, wherein:
a first portion of the data field includes a high bit of the exception information;
a second portion of the data field includes one or more low bits of the exception information; and
the user data provides instructions for performing one or more of (I) executing the task by the one or more computing devices, and (II) partitioning the distributed computing system.

14. A system comprising:
one or more computing devices and one or more storage devices storing instructions, which when executed by the one or more computing devices, cause the one or more computing devices to perform operations comprising:
receiving user data and graph data at a distributed computing system, the graph data describing a graph representing a task to be performed by one or more computing devices in the distributed computing system, the graph including a plurality of vertices connected by one or more edges, each of the vertices associated with one or more data fields that are included in a vertex names vector;
performing, by the one or more computing devices, the task using the user data and the graph data, wherein the performing comprises:
identifying a request to change an existing value of a data field associated with a particular vertex in the graph data, the request including a new value for the data field;
determining that a length of the new value for the data field is shorter than a length of the existing value of the data field; and
in response to determining that the length of the new value for the data field is shorter than the length of the existing value of the data field, replacing the existing value by (i) replacing a first portion of the data field that is associated with the particular vertex with exception information that indicates the length of the new value that is shorter than the length of the existing value, (ii) replacing a second portion of the data field that is associated with the particular vertex with the new value, and (iii) updating a flag in an exception flag vector to indicate an inclusion of the exception information in the data field, the flag being located at a position in the exception flag vector that indicates a position of the data field in the vertex names vector; and
providing, by the one or more computing devices, an output for the task, wherein the output is determined using, in part, the data field that includes the exception information.

15. The system of claim 14, wherein:
a location of the exception information is provided by data stored in a vector names index vector, wherein the position of the flag in the exception flag vector corresponds to a position of the data stored in the vector names index vector.

16. The system of claim 14, wherein the graph data describing the graph representing the task to be performed by the one or more computing devices in the distributed computing system comprises data indicative of one or more of vertex names, vertex values, edge values, and edge destinations of the graph, and wherein the identifying the request to change the existing value of the data field comprises:
analyzing a request to change one or more of a vertex name, a vertex value, an edge value, and an edge destination in the graph.

17. The system of claim 14, wherein the operations further comprise assigning a user-defined value in the user data to the particular vertex in the graph;

storing, in a first vertex flag vector, a flag indicating that the particular vector in the data field is active; and in response to replacing the existing value, storing, in a second vertex flag vector, a flag indicating that the particular vector in the data field has been modified.

\* \* \* \* \*

UNITED STATES PATENT AND TRADEMARK OFFICE
CERTIFICATE OF CORRECTION

| | | |
|---|---|---|
| PATENT NO. | : 10,394,792 B1 | Page 1 of 1 |
| APPLICATION NO. | : 15/285840 | |
| DATED | : August 27, 2019 | |
| INVENTOR(S) | : Dehnert et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 109 days.

Signed and Sealed this
Second Day of June, 2020

Andrei Iancu
*Director of the United States Patent and Trademark Office*